US006175624B1

United States Patent
Brundieck et al.

(10) Patent No.: US 6,175,624 B1
(45) Date of Patent: Jan. 16, 2001

(54) METHOD FOR CONNECTING A BATTERY CIRCUIT IN A CELLULAR TELEPHONE

(75) Inventors: Shane R. Brundieck; Monty D. Rohde, both of Lincoln, NE (US)

(73) Assignee: Centurion International, Inc., Lincoln, NE (US)

(*) Notice: Under 35 U.S.C. 154(b), the term of this patent shall be extended for 0 days.

(21) Appl. No.: 09/263,645

(22) Filed: Mar. 5, 1999

(51) Int. Cl.[7] .................................................. H04M 1/00
(52) U.S. Cl. ............................................................ 379/433
(58) Field of Search .................................. 379/433, 428; 455/575, 90, 572, 573; 320/110, 112, 119, 120, 121

(56) References Cited

U.S. PATENT DOCUMENTS 5,857,148 * 1/1999 Weisshappel et al. ............... 379/428

* cited by examiner

Primary Examiner—Jack Chiang
(74) Attorney, Agent, or Firm—Zarley, McKee, Thomte, Voorhees & Sease; Dennis L. Thomte

(57) ABSTRACT

A connector is provided for use in a battery pack for connecting the battery cells to the telephone and to a battery charger. The connector utilizes stamped nickel contact pads which may be spot welded directly to the battery cells. The use of the stamped nickel contact pads results in improvements in strength of the connector and a reduction in the cost as compared to the prior art flexible circuit board-type connectors.

7 Claims, 3 Drawing Sheets

METHOD FOR CONNECTING A BATTERY CIRCUIT IN A CELLULAR TELEPHONE

BACKGROUND OF THE INVENTION

1. Field of the Invention

This invention relates to a method of connecting a battery circuit in a cellular telephone and more particularly to an electrical connection for telephone and charge connection in a battery pack.

2. Description of the Related Art

Battery packs for use with cellular telephones or the like normally employ a plurality of battery cells generally comprised of nickel metal hydride material. The battery cells are positioned in a battery pack housing and are electrically connected together. Previous electrical connectors or connections have been provided for connecting the battery cells in the battery pack to the telephone and to a battery charger. One old method of providing the connection was to utilize a flexible circuit board to connect the spring rails to the connector as well as the thermistor. The batteries were connected to the flexible circuit board by a spot weld joint between a nickel ribbon and a bare copper pad. The flexible circuit board is soldered to the spring rails with the thermistor being soldered to the flexible circuit board. The prior art method described hereinabove results in a more costly construction and the flexible circuit board does not normally have the necessary strength for connection between the battery cells and the spring rails of the connection.

SUMMARY OF THE INVENTION

An electrical connection is described for connecting the battery cells in a battery pack in a suitable manner for enabling the battery cells to be connected to the telephone and to a battery charger. The battery pack comprises an elongated hollow housing having a plurality of battery cells positioned therein. A contact assembly or connection is positioned in the housing and comprises an elongated, substantially flat, electrically conductive, positive contact leg which is spaced from a substantially flat, electrically conductive, negative contact leg. The negative and positive contact legs are positioned substantially parallel with respect to one another in a spaced-apart relationship. An elongated, electrically conductive tab member has one end thereof electrically connected to the negative contact leg and extends therefrom towards the positive contact leg. A thermistor has one lead electrically connected to the tab member and a second lead electrically connected to the positive contact lead. An electrically conductive, first contact pad is electrically connected to the positive contact leg and extends therefrom towards the negative contact leg. An electrically conductive second contact pad is electrically connected to the negative contact leg and extends therefrom towards the positive contact leg. The first and second contact pads are comprised of a nickel material. The contact pads are bent so that end portions thereof will be positioned in a plane transverse to the longitudinal axis of the contact legs. The end portions of the contact pads are soldered to a pair of the battery cells. The ends of the first and second contact legs have contact portions protruding therefrom. A cover is secured to the housing to close the same and had four spaced-apart openings formed therein which receive the contact portions of the positive contact leg and the negative contact leg. When the battery pack is installed in a cellular telephone or the like, the contact portions provide an electrical connection for telephone and charge connection.

It is therefore a principal object of the invention to provide an improved electrical connection for use in a battery pack.

Still another object of the invention is to provide an electrical connection for use in a battery pack which enables the battery cells to be connected to the telephone or the battery charger.

Still another object of the invention is to provide an electrical connector of the type described which utilizes stamped nickel pads to connect the spring rails and thermistor thereof.

Still another object of the invention is to provide an electrical connector of the type described which results in a reduction of cost in fabricating the battery pack in to which the connector is installed.

Still another object of the invention is to provide an electrical connector of the type described hereinabove which results in a more sturdy connector.

These and other objects will be apparent to those skilled in the art.

DESCRIPTION OF THE PREFERRED EMBODIMENT

Figure 1:
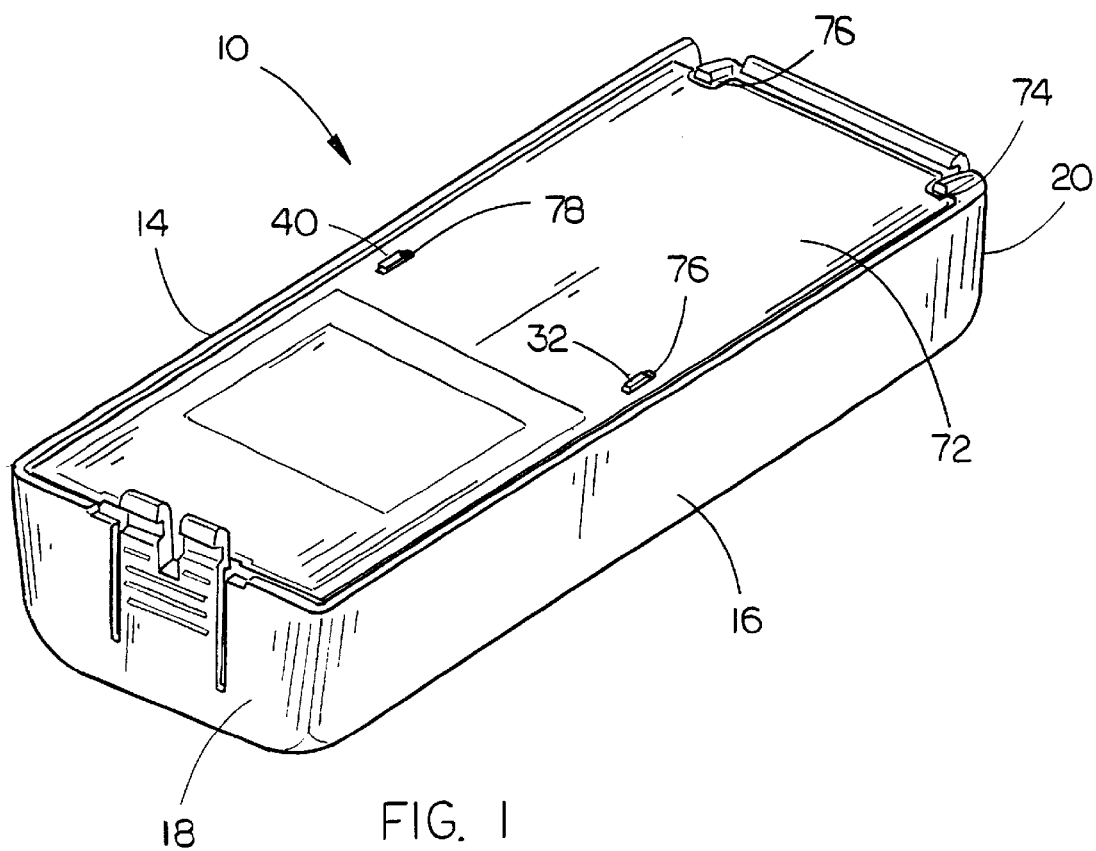
FIG. 1 is a perspective view of the battery pack.

The numeral 10 refers to a battery pack housing which includes a wall 12, side walls 14 and 16, and end walls 18 and 20. In some situations, an elongated piece of rubber tape 24 is placed in the housing prior to any batteries being installed therein with the rubber tape serving as a cushioning device which also prevents the battery cells from rattling within the housing 10. A plurality of battery cells 26, usually five in number, are placed in the housing 10 and are electrically connected together in conventional fashion.

Figure 2:
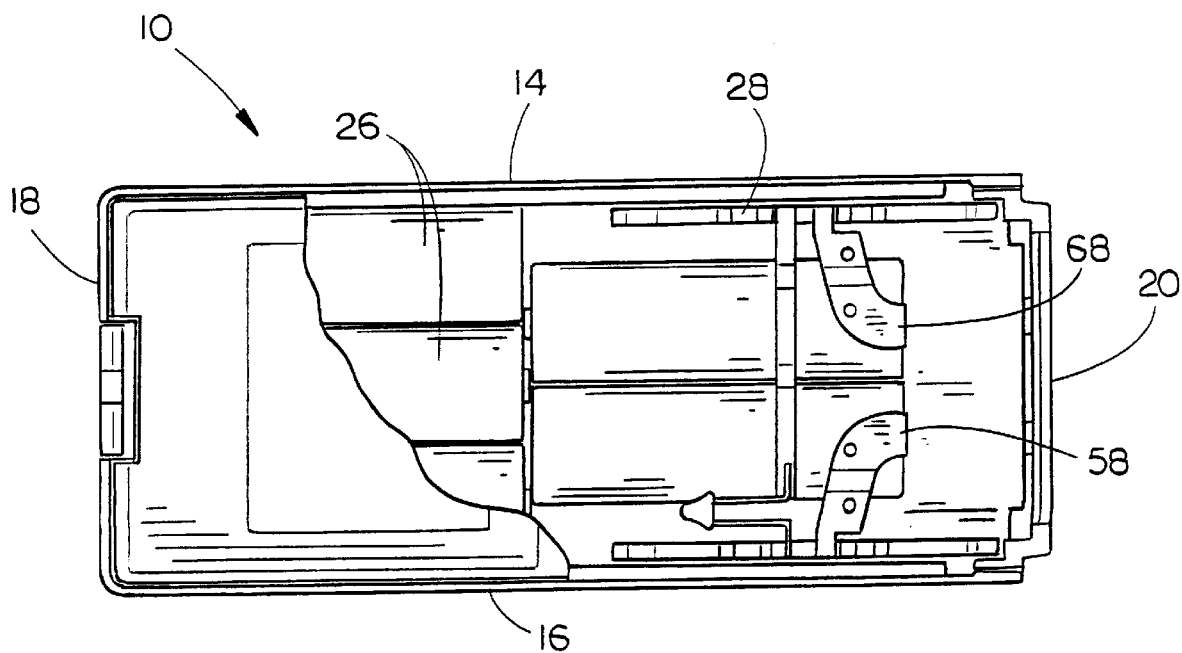
FIG. 2 is a top view of the battery pack with portions thereof cut away to more fully illustrate the invention.
Figure 3:
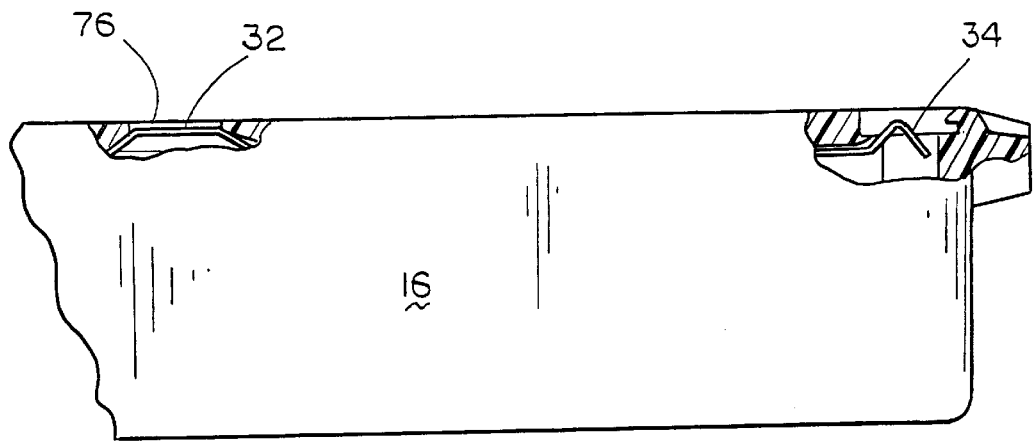
FIG. 3 is a partial side view of the battery pack with portions thereof cut away to more fully illustrate the invention.

The numeral 28 refers to the electrical connector of this invention which is positioned over a pair of the batteries, as illustrated in FIG. 2. Connector 28 includes an elongated, substantially flat, positive contact leg 30 having contact portions 32 and 34 adjacent the opposite ends thereof. Contact leg 30 is also provided with a plurality of conventional plastic stand-off posts 36 which extend from the leg 30. Connector 28 also includes an elongated, substantially flat, electrically conductive, negative contact leg 38 having contact portions 40 and 42 provided thereon adjacent the opposite ends thereof. Contact leg 38 also includes a plurality of plastic stand-off posts 43 protruding therefrom in conventional fashion.

An electrically conductive, substantially flat, tab member 44 has one end soldered to negative contact leg 38 and extends therefrom towards contact leg 30, as illustrated in the drawings. The numeral 46 refers to a conventional thermistor having one lead 48 soldered to the end of tab member 44 and a lead 50 soldered to positive contact leg 30. Preferably, contact legs 30 and 38 are comprised of a BeCu material.

The numeral 52 refers to a contact having one end 54 soldered to positive contact leg 30, as illustrated in the drawings, and which has a contact portion 56 extending inwardly from the solder connection and an end portion 58 which extends therefrom, as illustrated in the drawings. Contact 52 includes an elongated slot 60 formed therein adjacent the end thereof.

Figure 4:
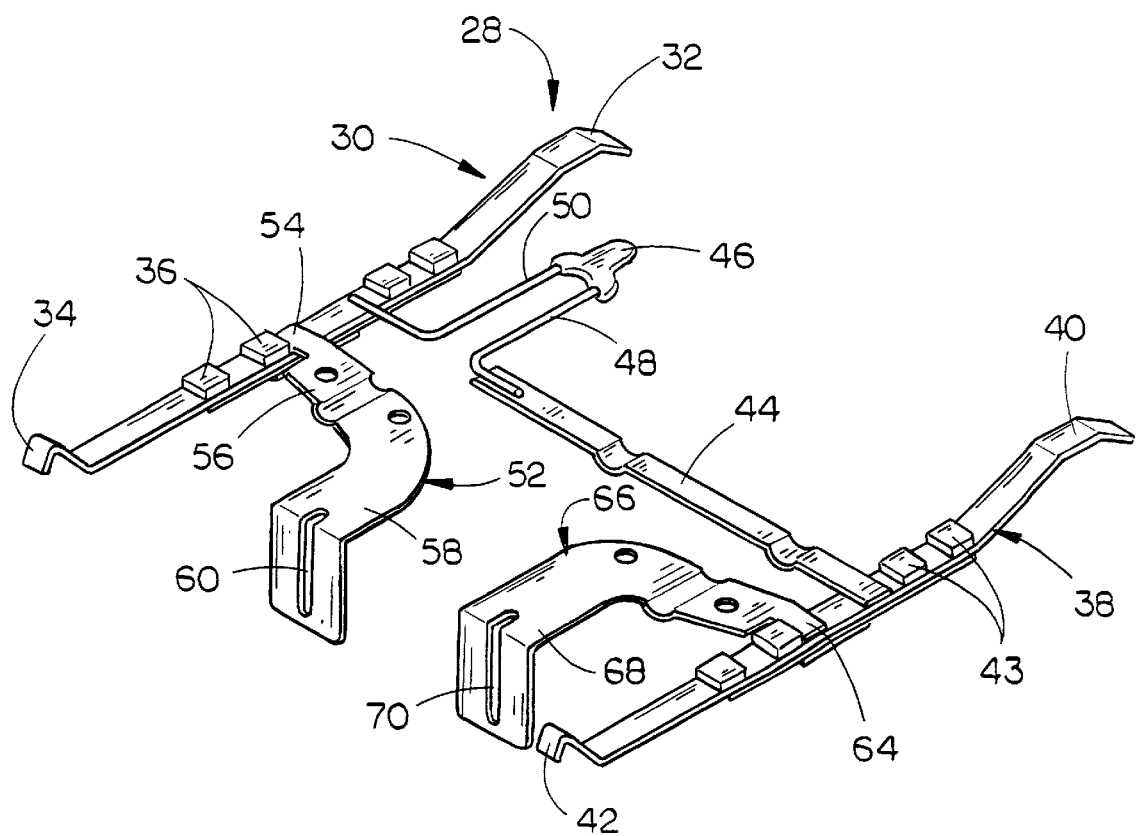
FIG. 4 is a perspective view of the contact assembly of this invention.
Figure 5:
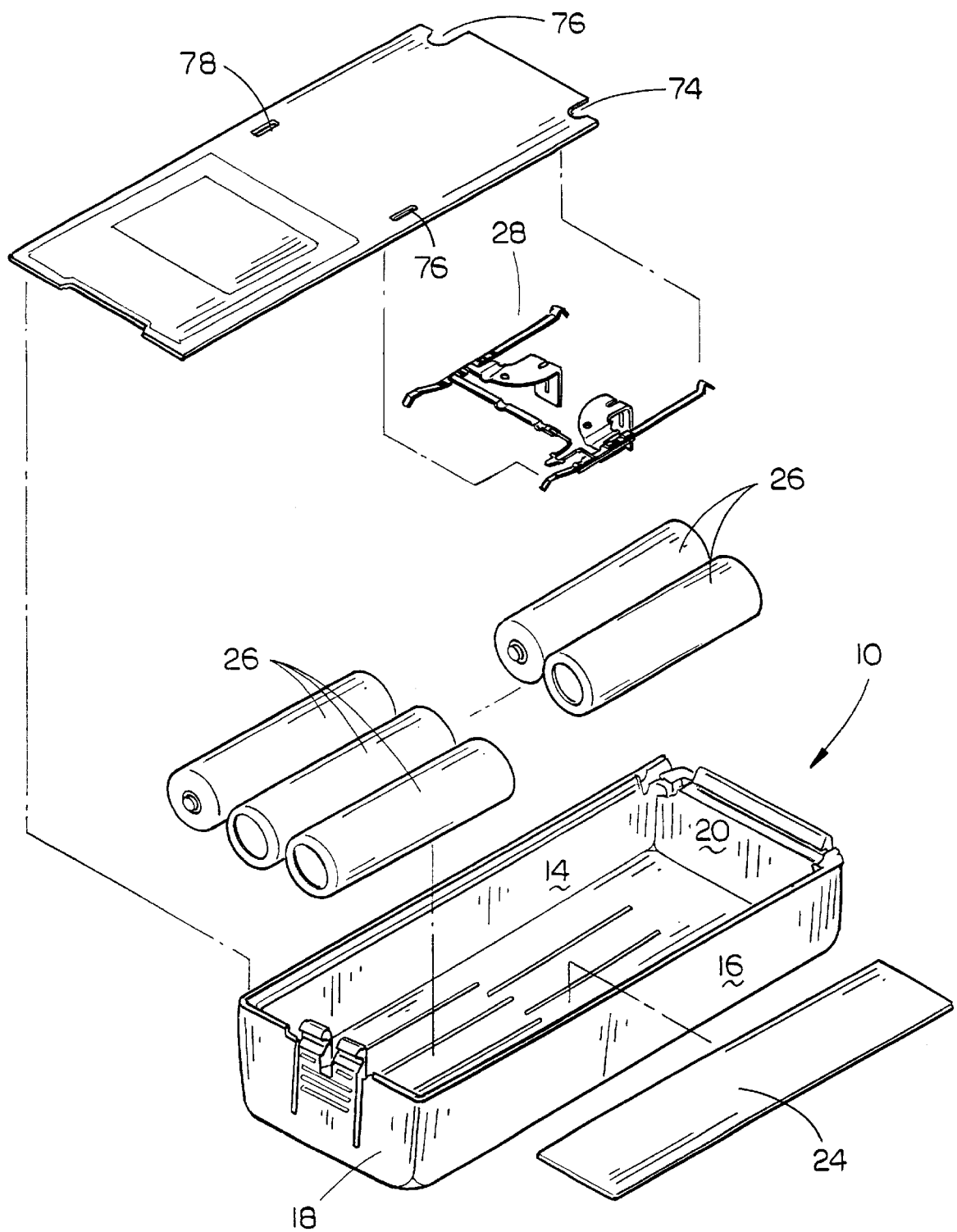
FIG. 5 is an exploded perspective view of the battery pack and contact assembly of this invention.

Similarly, the numeral 62 refers to a contact having one end 64 soldered to contact leg 38 and which includes a portion 66 extending inwardly from the solder connection and an end portion 68 which has an elongated slot 70 formed therein. Preferably, the contact legs 30 and 38 are comprised of stamped nickel pads. Prior to insertion into the housing 10, the end portions 58 and 68 are bent downwardly so that the end portions 58 and 68 are disposed substantially transversely to the longitudinal axes of legs 30 and 38. FIG. 4 illustrates that the contact portions 34 and 42 have a V-shape while it can be seen that the contact portions 32 and 40 have a somewhat flat configuration which dwell in a plane above the longitudinal axes of the contact legs.

The battery cells 26 are normally glued into the housing 10 in conventional fashion. The connector 28 is then positioned over a pair of the batteries, as illustrated in FIG. 2, with the end portions 58 and 68 being spot welded to the ends of a pair of the battery cells. The connector 28 is normally secured to the battery cells prior to the battery cells being installed into the housing 10.

A cover 72 is then secured to the housing 10 in conventional fashion by sonic welding or the like to close the housing 10. Cover 72 includes openings 74 and 76 which receive the contact portions 34 and 42 of contact legs 30 and 38, respectively. Cover 72 is also provided with a pair of openings 76 and 78 formed therein which receive the contact portions 32 and 40 of legs 30 and 38, respectively.

Thus, when the battery pack is installed on the telephone or a battery charger, the contact portions on both the contact legs 30 and 38 will be exposed, providing an electrical connection for the telephone and the battery charger.

The utilization of stamped nickel contacts rather than a copper flexible circuit board enables the stamped parts to be soldered directly to the contact rails for phone interface. Thermistor 46 is also soldered to the stampings for charge control. The fact that the contacts 52 and 62 are comprised of a nickel material enables them to be spot welded directly to the cell pack. Preferably, the contacts 52 and 62 have selectively plated areas of TNPB to improve the solderability to the contact legs 30 and 38. The instant invention eliminates the tabs between the old flexible circuit board and the battery cell pack. The connector of this invention improves the mechanical properties and strength of the circuit, which has been proven in destructive testing. The elimination of copper surface contamination problems found in the prior art improves welding and soldering. The reduction in cost of the connector of this invention results in a cost reduction of approximately forty percent over the prior art connector.

Thus it can be seen that the invention accomplishes at least all of its stated objectives.

We claim:

1. A battery pack, comprising:

an elongated hollow housing having first and second end walls, opposite side walls, and a back wall;

a plurality of electrically connected battery cells positioned in said housing;

a contact assembly positioned in said housing comprising an elongated, substantially flat, electrically conductive, positive contact leg having first and second ends, an elongated, substantially flat, electrically conductive, negative contact leg having first and second ends, said negative and positive contact legs being substantially parallel with respect to one another in a spaced-apart relationship, an elongated, electrically conductive tab member having one end electrically connected to said negative contact leg and extending therefrom towards said positive contact leg, a thermistor having a first lead electrically connected to said tab member and a second lead electrically connected to said positive contact leg, an electrically conductive first contact pad electrically connected to said positive contact leg and extending therefrom towards said negative contact leg, an electrically conductive second contact pad electrically connected to said negative contact leg and extending therefrom towards said positive contact leg;

said first and second contact pads being comprised of a nickel material;

said contact pads being bent so that end portions thereof will be positioned in a plane transverse to the longitudinal axes of said contact legs;

said end portions of said first and second contact pads being soldered to a pair of said battery cells;

said first and second ends of said first and second contact legs having contact portions protruding outwardly with respect to said housing;

and a cover secured to said housing to close the same and having first and second ends, and opposite side edges;

said cover having first and second spaced-apart openings formed therein adjacent one of said side edges which receive said contact portions of said positive contact leg therein and having third and fourth spaced-apart openings formed therein adjacent the other of said side edges which receive said contact portions of said negative contact leg therein.

2. The battery pack of claim 1 wherein said contact legs are comprised of a BeCu material.

3. The battery pack of claim 1 wherein said tab member is soldered to said negative contact leg.

4. The battery pack of claim 3 wherein said first lead of said thermistor is soldered to said tab member and wherein said second lead of said thermistor is soldered to said positive contact leg.

5. The battery pack of claim 4 wherein said tab member is positioned between said contact pads and said first ends ofi contact legs.

6. The battery pack of claim 4 wherein said battery cells are nickel metal hydride battery cells.

7. The battery pack of claim 1 wherein said battery pack is designed to be mounted on a cell phone.

* * * * *